United States Patent Office 2,994,732
Patented Aug. 1, 1961

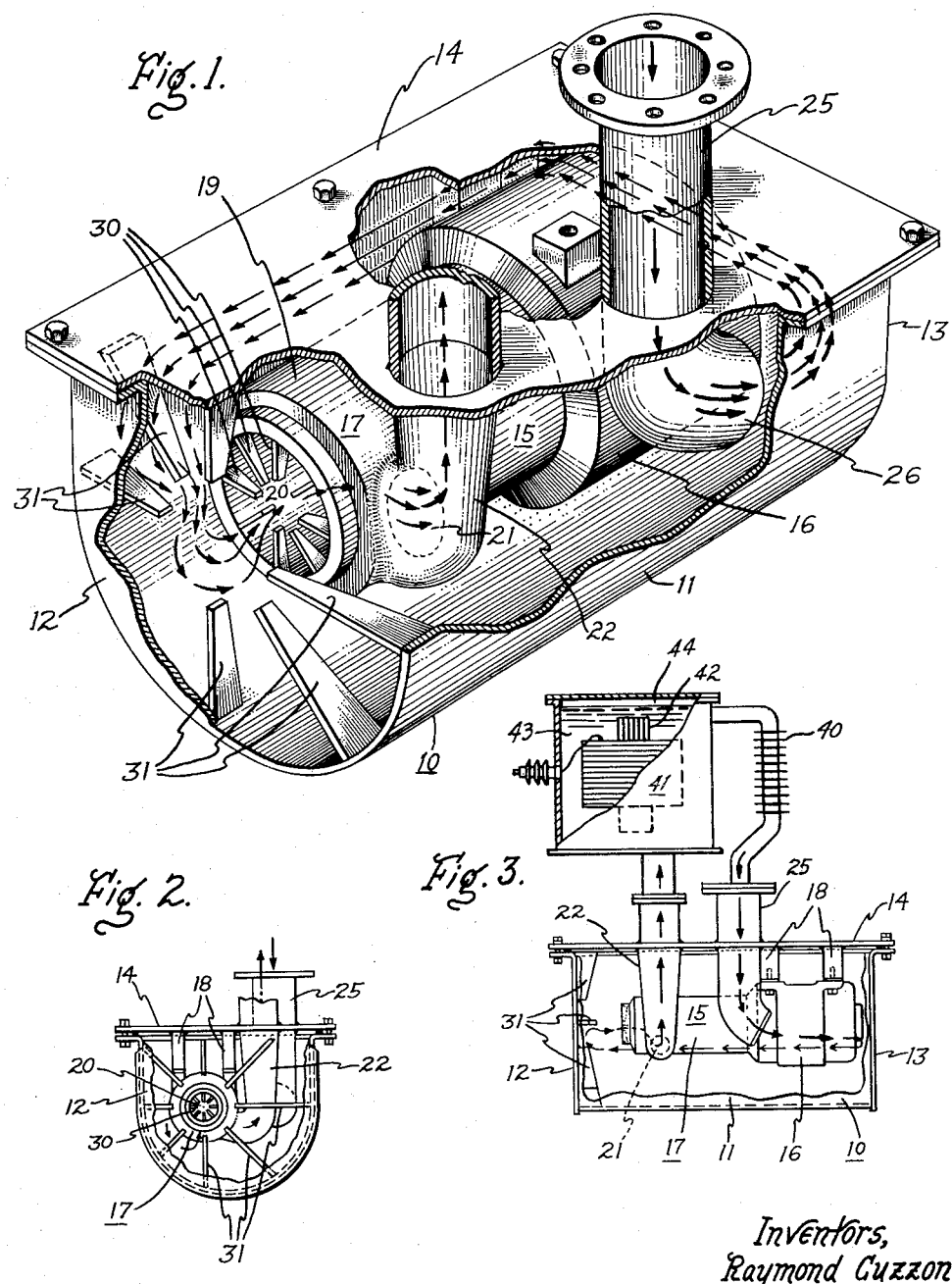

2,994,732
PUMP ENCLOSURE ASSEMBLY
Raymond Cuzzone and Howard A. Fohrhaltz, Pittsfield, Mass., assignors to General Electric Company, a corporation of New York
Filed Mar. 25, 1959, Ser. No. 801,940
5 Claims. (Cl. 174—15)

This invention relates to an improved pump enclosure assembly, and more in particular to an improved combination of a pump and enclosure that overcomes certain problems involved in the pumping of dielectric liquid such as transformer oil. While the pump enclosure assembly of the invention is particularly adaptable to electrical systems requiring dielectric liquid pumps, it will be obvious that the pump assembly may be employed in other applications without departing from the spirit or scope thereof.

Electrical apparatus of one type employed in systems for the generation and distribution of electrical power are comprised of an electrical device, such as a transformer, immersed in a dielectric liquid such as transformer oil within a sealed enclosure. In order to remove heat from the electrical device generated during operation thereof, a radiator may be employed externally of the enclosure and connected to the enclosure. The dissipation of heat from the radiator and device may be increased by employing a pump for circulating the liquid through the enclosure and radiator.

In order to permit expansion and contraction of the liquid within the enclosure, the enclosures are frequently provided with a gas-filled space above the electrical device. Depending upon the temperature and the pressure of the liquid, a certain amount of gas will be absorbed in the liquid. Under certain conditions, such as a rapid decrease of pressure within the enclosure, the liquid may become super-saturated with gas. If no disturbance occurs within the circulation system of the apparatus, the gas will gradually be released to the gas space above the liquid until equilibrium is again reached. If disturbances such as mechanical stirring action are present within the circulation system through which the super-saturated liquid flows, however, some of the gas may be released in the form of gas bubbles, and these bubbles passing through the electrical device may result in sufficient reduction of the dielectric strength of the device to permit electrical breakdown.

Therefore, in the provision of a pump for the circulation system of such electrical apparatus, it is necessary that the pump operate in such a manner that the liquid is not disturbed or agitated sufficiently, as by cavitation or turbulence, in order to permit the formation of gas bubbles within the liquid. It it also desirable in the provision of a pump for pumping the circulating liquid in such electrical apparatus, that the pump does not produce excessive noise that may be a cause for complaints when the apparatus is disposed in populated areas.

It is therefore an object of this invention to provide an improved pump enclosure assembly that minimizes the effects of cavitation and turbulence.

Another object is to provide a pump enclosure assembly, especially adapted for use in pumping dielectric liquids of electrical apparatus, the assembly being characterized by the fact that it minimizes turbulence within the dielectric liquid that may result in the formation of gas bubbles therein, it minimizes the effects of cavitation that may also result in the formation of gas bubbles within the liquid, and that also minimizes noise transmitted from the assembly.

Briefly stated, in accordance with one aspect of the invention, we provide a pump enclosure assembly comprising a pump means and a pump motor means, for driving the pump means, mounted within an enclosure. An outlet aperture is provided in the pump means, and an outlet conduit extending through the wall of the enclosure is connected to the outlet aperture. An inlet aperture is also provided on the pump means within the enclosure, the inlet aperture facing one end of the enclosure and spaced therefrom. An inlet conduit extends through a wall of the enclosure, and flow directing means are provided for directing the flow of liquid through the inlet conduit into the enclosure toward the other end of the enclosure. Straightening means are provided within the inlet aperture of the pump means, and straightening means may also be applied to the one wall of the enclosure toward the pump inlet aperture in order to further aid in the directing of fluid flow within the assembly to achieve the above stated objectives.

While the specification concludes with claims particularly pointing out and distinctly claiming the subject matter which we regard as our invention, it is believed that the invention will be better understood from the following description taken in connection with the accompanying drawing.

In the drawing:
FIG. 1 is a perspective partially broken away view of a pump enclosure assembly according to the invention,
FIG. 2 is a partially broken away view of the left end of the pump enclosure assembly of FIG. 1 drawn to a reduced scale, and
FIG. 3 is a partially broken away view of the right side of the pump enclosure assembly of FIG. 1, drawn to a reduced scale, and showing the pump assembly in combination with a schematically illustrated transformer drawn to a greatly reduced scale.

Referring now to the drawing, and more in particular to FIG. 1, therein is illustrated a pump enclosure assembly comprising a sealed enclosure or housing 10. The enclosure 10 may, for example, have a cylindrical main portion 11, generally semi-circular end plates 12 and 13 on opposite ends of the portion 11, and a substantially flat top plate 14 bolted or otherwise rigidly affixed to the top of the cylindrical portion 11 and end plates 12. While this shape for the enclosure has been found to be particularly suitable in one application thereof, it will be obvious that other configurations may be employed without departing from the spirit or the scope of the invention.

A pump assembly, generally designated by the numeral 15 is rigidly mounted within the enclosure 10. The pump assembly 15 may be comprised of a pump motor 16 and a pump 17. The pump assembly 15 is rigidly mounted within the enclosure 10, for example to the plate 14 by means of brackets 18 as illustrated in FIGURES 2 and 3. The pump 17 is preferably, although not necessarily, a centrifugal pump of the type having a vaned rotor disposed for rotation by means of the motor 16 within the pump housing 19. The pump 17 has an inlet port 20 directed toward and spaced apart from the end 12 of the enclosure. The pump 17 also has an outlet port 21 connected by means of a conduit 22 through the plate 14 of the enclosure 10. An inlet conduit 25 extends through the top plate 14 of the enclosure 10, the end of the conduit 25 within the enclosure being provided with an elbow 26 to direct fluid flowing through the conduit 25 toward the end plate 13 of the enclosure 10. The elbow 26 preferably has about a 45° angle bend. The inlet conduit 25 may be connected to the low temperature side of radiator means 40 which is connected to a sealed enclosure tank 41 containing a conventional electrical transformer 42. The transformer 42 is immersed in a dielectric liquid 43 that fills the enclosure 42 except for a space at the upper end of the enclosure which is occupied by a gas 44. The discharge conduit 22 may be connected to the enclosure 41 so as to discharge the liquid 43 thereinto.

The inlet port 20 of the pump 17 is provided with a plurality of straightening vanes 30. The vanes 30 may, for example, as illustrated in FIG. 1, extend radially of the port 20 or they may be in any other conventional form, such as a plurality of fins or vanes extending across the port in transverse groups of parallel vanes. The inlet port is spaced from the end plate 12 at least a distance equal to the diameter of the inlet conduit 25 in order to prevent "starving" of the pump. A plurality of straightening vanes 31 are also provided on the inner surface of the end plate 12 toward the port 20. The vanes 31 may also extend radially on the end plate 12 about an extension of the axis of the pump.

In operation, the fluid or liquid flows into the pump enclosure 10 by way of conduit 25 and elbow 26. The elbow 26 directs the majority of the liquid toward the end plate 13, as illustrated by the arrows in the drawings. The flow then proceeds generally along the plate 13 between the one end of the motor 16 and the plate 13, thence along one side of the cylindrical portion 11 of the enclosure 10 and toward the end plate 12. The flow then proceeds between the end plate 12 and pump 17, and into the inlet port 20 through straightening vanes 30. The pump 17 then forces the liquid through the exhaust port 21 and into the exhaust outlet conduit 22.

Since the motor 16 is disposed within the enclosure 10, no rotary shaft seals are necessary on the motor shaft. Mounting of the pump 16 within the enclosure 10 also eliminates the need for auxiliary cooling means for the motor, since the flow of liquid within the enclosure 10 removes heat from the motor. The immersion of the motor in the liquid also reduces the transmission of noise from the motor.

While straightening vanes, such as vanes 30 have previously been employed on pumps to reduce turbulence, it has been found that neither the vanes 30 by themselves nor in combination with the vanes 31 on end plate 12 sufficiently straightened the flow of liquid into the inward port to eliminate cavitation and turbulence, and hence when only these two means were provided for directing the flow of liquid it was possible for the pump 17 to produce gas bubbles in the liquid. By providing the elbow 26, however, which directs the liquid toward the end plate 13, any rotational flow of liquid within the enclosure 10 about the pump assembly 15 is substantially reduced, so that there is no substantial rotary component to the liquid about the axis of the port 20 as would be the case if the conduit 25 were not terminated by an elbow 26. Aside from directing the liquid in closer heat transfer relationship with the motor 16, the elbow 26 thus also serves to substantially remove a rotary component of the liquid within the enclosure 10 so that the vanes 30 and 31 are effective in removing turbulence within the enclosure that may result in the release of gas bubbles from the liquid.

The action of the elbow 26 in reducing turbulence within the enclosure 10 may be better explained with reference to FIG. 2 of the drawing. If the inlet conduit 26 were not provided with the elbow 26, a rotary motion would be imparted to the flow of liquid at it enters the enclosure 10, as a result of the liquid being directed against the wall of the cylindrical portion 11 of the enclosure. In the illustration of FIG. 2, this rotary flow would be clockwise with respect to the axis of the port 20. The vanes 30 and 31 are not sufficient to straighten this rotary motion, so that if the pump impeller is rotating counter clock-wise considerable turbulence will result from the clock-wise flow of liquid into the impeller. When the elbow 26 is provided, however, the flow of liquid into the aperture 20 has been found to be sufficiently straight that gas bubble releasing turbulence within the pump is substantially eliminated regardless of the direction of the rotation of the pump impeller.

Although it may be desirable to provide the straightening vanes 31 on the end plate 12 of the enclosure in order to further eliminate the danger of turbulence, it has been found that the combination of the means 30 on the inlet port and the elbow 26 on the end of inlet conduit 25 sufficiently straightened the flow to the aperture 20 to eliminate the production of gas bubbles in the liquid for most practical applications.

The pump enclosure assembly of the invention, as previously disclosed, therefore provides means for substantially eliminating the effects of turbulence and cavitation that result in the production of gas bubbles in a liquid being pumped. The pump enclosure assembly also eliminates the need for shaft seals on the pump motor, and since the liquid within the enclosure flows around the motor, no additional cooling system for the motor is required. While the invention is particularly useful in the circulation system of electrical apparatus employing dielectric liquids, it will be obvious that it may be advantageously employed in other applications without departing from the spirit or scope thereof.

It will be understood, of course, that while the form of the invention herein shown and described constitutes the preferred embodiment of the invention, it is not intended herein to illustrate all of the possible equivalent forms or ramifications thereof. It will also be understood that the words employed are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. A pump enclosure assembly comprising a centrifugal pump having an inlet aperture and an outlet aperture, motor means connected to drive said pump, said pump being mounted within a sealed enclosure having a cylindrical main portion, one end facing and spaced from said inlet aperture, and an opposite end spaced from an end of said motor, outlet conduit means extending through a wall of said enclosure and connected to said outlet aperture, straightening vanes in said inlet aperture, an inlet conduit extending through a wall of said enclosure, and elbow means on the end of said inlet conduit within said enclosure and directing liquid flowing through said inlet conduit towards said opposite end of said enclosure.

2. The pump enclosure assembly of claim 1 in which the distance between said one end of said enclosure and said inlet aperture is at least equal to the diameter of said inlet conduit.

3. The pump enclosure assembly of claim 1 in which straightening vanes are mounted on said one end of said enclosure within said enclosure and facing said inlet aperture.

4. Electrical apparatus comprising an electric device which generates heat during normal operation, said electric device being immersed in a dielectric liquid within a sealed enclosure, a portion of the space in said enclosure above said electric device being filled with a gas which is absorbed by said dielectric liquid in varying amounts with changes in temperature and pressure within said enclosure, radiator means connected to said enclosure for removing heat from said dielectric liquid, a pump assembly connected to said enclosure and to said radiator means for circulating said dielectric liquid through said radiator means, said assembly comprising a pump mounted within a sealed housing, said pump having an outlet aperture connected to an outlet conduit extending through a wall of said housing, said pump having an inlet aperture facing one end of said housing and spaced therefrom, an inlet conduit extending through a wall of said housing, one of said conduits being connected to said radiator means and the other of said conduits being connected to the interior of said enclosure, and means for preventing the release of bubbles of said gas absorbed by said liquid dielectric comprising an end of said inlet conduit arranged to direct the dielectric liquid flowing therethrough toward an end of said housing opposite said one end, and liquid flow straightening vanes adjacent said inlet aperture at said one end of said housing, whereby cavitation and turbulence within said dielectric liquid will be inhibited, thus preventing the evolution of gas bubbles from the liquid.

5. Electrical apparatus comprising an electric device which generates heat during normal operation, said electric device being immersed in a dielectric liquid within a sealed enclosure, a portion of the space in said enclosure above said electric device being filled with a gas which is absorbed by said dielectric liquid in varying amounts with changes in temperature and pressure within said enclosure, radiator means connected to said enclosure for removing heat from said dielectric liquid, a pump assembly connected to said enclosure and to said radiator means for circulating said dielectric liquid through said radiator means, said assembly comprising a centrifugal pump mounted within a sealed housing, a motor wholly enclosed in said housing connected to and driving said pump, said pump having an outlet aperture connected to an outlet conduit extending through a wall of said housing, said pump having an inlet aperture facing one end of said housing, an inlet conduit extending through a wall of said housing, said pump inlet aperture being spaced from said one end of said enclosure by a distance at least equal to the diameter of said inlet conduit, one of said conduits being connected to said radiator means and the other of said conduits being connected to the interior of said enclosure, and means for preventing the release of bubbles of said gas absorbed by said liquid dielectric comprising an elbow at the end of said inlet conduit arranged to direct the dielectric liquid flowing therethrough toward an end of said housing opposite said one end, liquid flow straightening vanes affixed to said one end of said housing, adjacent said inlet aperture, and other liquid flow straightening vanes affixed to said pump across said inlet aperture, whereby cavitation and turbulence within said dielectric liquid will be inhibited, thus preventing the evolution of gas bubbles from the liquid.

References Cited in the file of this patent

UNITED STATES PATENTS

| | | |
|---|---|---|
| 854,312 | Skinner et al. | May 21, 1907 |
| 1,472,560 | Griffiths et al. | Oct. 30, 1923 |
| 2,346,372 | Foottit et al. | Apr. 11, 1944 |
| 2,546,034 | Lansing | Mar. 20, 1951 |
| 2,781,831 | Angell | Feb. 19, 1957 |